United States Patent
Wu

(10) Patent No.: US 10,206,151 B2
(45) Date of Patent: Feb. 12, 2019

(54) DEVICE AND METHOD FOR HANDLING A CELLULAR-WIRELESS LOCAL AREA NETWORK AGGREGATION

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 53 days.

(21) Appl. No.: 15/657,220

(22) Filed: Jul. 24, 2017

(65) Prior Publication Data

US 2018/0027459 A1 Jan. 25, 2018

Related U.S. Application Data

(60) Provisional application No. 62/366,091, filed on Jul. 24, 2016, provisional application No. 62/409,326, filed on Oct. 17, 2016.

(51) Int. Cl.
| | |
|---|---|
| *H04W 36/00* | (2009.01) |
| *H04L 5/00* | (2006.01) |
| *H04W 76/19* | (2018.01) |
| *H04W 84/12* | (2009.01) |

(Continued)

(52) U.S. Cl.
CPC ......... *H04W 36/0066* (2013.01); *H04L 5/001* (2013.01); *H04L 5/0092* (2013.01); *H04W 36/0022* (2013.01); *H04W 76/19* (2018.02); *H04W 36/0069* (2018.08);

(Continued)

(58) Field of Classification Search
None
See application file for complete search history.

(56) References Cited

U.S. PATENT DOCUMENTS 10,123,371 B2 * 11/2018 Li ................. H04W 76/16
2012/0140743 A1 6/2012 Pelletier (Continued)

FOREIGN PATENT DOCUMENTS

TW 201507400 A 2/2015

OTHER PUBLICATIONS

3GPP TSG-RAN WG2 Meeting #97, R2-1702229, Athens, Greece, Feb. 13-17, 2017.

(Continued)

*Primary Examiner* — Michael J Moore, Jr.
(74) *Attorney, Agent, or Firm* — Winston Hsu

(57) ABSTRACT

A communication device for handling a CWA comprises a storage device for storing instructions and a processing circuit coupled to the storage device. The processing circuit is configured to execute the instructions stored in the storage device. The instructions comprise receiving a radio bearer configuration configuring a radio bearer as a CWA bearer and a CWA configuration, from a cell of a cellular network; configuring the radio bearer as the CWA bearer according to the radio bearer configuration; enabling data handling for the CWAAP entity in response to the CWA configuration; communicating a plurality of CWAAP PDUs associated to the CWA bearer with a WLAN at the CWAAP entity; receiving a handover command from the cell or performing a RRC connection reestablishment procedure; and disabling the data handling for the CWA bearer at the CWAAP entity, and determining that the radio bearer is a cellular-only bearer.

15 Claims, 7 Drawing Sheets

(51) Int. Cl.
*H04W 36/28* (2009.01)
*H04W 76/16* (2018.01)

(52) U.S. Cl.
CPC ............ *H04W 36/28* (2013.01); *H04W 76/16* (2018.02); *H04W 84/12* (2013.01)

(56) References Cited

U.S. PATENT DOCUMENTS

| | | | |
|---|---|---|---|
| 2013/0083661 A1* | 4/2013 | Gupta | H04W 4/70 370/235 |
| 2013/0242897 A1 | 9/2013 | Meylan | |
| 2014/0079022 A1 | 3/2014 | Wang | |
| 2015/0049707 A1 | 2/2015 | Vajapeyam | |
| 2016/0142954 A1 | 5/2016 | Cho | |
| 2016/0234726 A1* | 8/2016 | Nuggehalli | H04W 36/0022 |
| 2017/0078890 A1* | 3/2017 | Zhu | H04W 16/14 |
| 2017/0099625 A1* | 4/2017 | Li | H04W 28/08 |
| 2017/0289855 A1* | 10/2017 | Xu | H04W 36/0016 |
| 2017/0318493 A1* | 11/2017 | Laselva | H04W 28/08 |
| 2017/0367035 A1* | 12/2017 | Koskela | H04L 5/001 |
| 2018/0070276 A1* | 3/2018 | Wu | H04W 76/19 |
| 2018/0192331 A1* | 7/2018 | Masini | H04W 36/0027 |
| 2018/0227976 A1* | 8/2018 | Dudda | H04W 36/00 |
| 2018/0234869 A1* | 8/2018 | Sirotkin | H04W 24/10 |

OTHER PUBLICATIONS

Search Report dated Dec. 19, 2017 for EP application No. 17182825. 4, pp. 1-6.

Samsung, "LWA DRB reconfiguration, RRC PDU and procedural aspects", 3GPP TSG-RAN2#93 meeting, Tdoc R2-161223, Feb. 15-19, 2016, St Julian's, Malta, XP051065596, pp. 1-12.

Nokia, Alcatel-Lucent Shanghai Bell, "Inter-eNB HO without WT change-solution considerations", 3GPP TSG-RAN WG3 Meeting #92, R3-161068, May 23-27, 2016, Nanjing, P.R.China, XP051105878, pp. 1-7.

Intel Corporation, China Telecom, Qualcomm Incorporated, "Running 36.300 CR for LTE-WLAN Radio Level Integration and Interworking Enhancement", 3GPP TSG-RAN2 Meeting 91bis, R2-154988, Oct. 4-10, 2015, Malmo, Sweden, XP051024161, pp. 1-20.

Notice of Allowance dated Dec. 19, 2017 for the Taiwan application No. 106124765, filed Jul. 24, 2017, p. 1-4.

* cited by examiner

DEVICE AND METHOD FOR HANDLING A CELLULAR-WIRELESS LOCAL AREA NETWORK AGGREGATION

CROSS REFERENCE TO RELATED APPLICATIONS

This application claims the benefit of U.S. Provisional Applications Nos. 62/366,091 filed on Jul. 24, 2016 and 62/409,326 filed on Oct. 17, 2016, which are incorporated herein by reference.

BACKGROUND OF THE INVENTION

1. Field of the Invention

The present invention relates to a device and a method used in a wireless communication system, and more particularly, to a device and a method of handling a cellular-wireless local area network (WLAN) aggregation (CWA).

2. Description of the Prior Art

A user-equipment (UE) may be configured with a long-term evolution (LTE)-wireless local area network (WLAN) aggregation (LWA) data radio bearer (DRB). Upon a handover, the UE releases a LWA according to the 3rd Generation Partnership Project (3GPP) specification. When releasing the LWA configuration, the UE disables data handling for the LWA DRB. However, it is not clear how to enable data handling for the LWA DRB after the handover.

SUMMARY OF THE INVENTION

The present invention therefore provides a communication device for handling a cellular-WLAN aggregation (CWA) to solve the abovementioned problem.

A communication device for handling a CWA comprises a storage device for storing instructions and a processing circuit coupled to the storage device. The processing circuit is configured to execute the instructions stored in the storage device. The instructions comprise receiving a first radio bearer configuration configuring a radio bearer as a CWA bearer and a first CWA configuration, from a first cell of a cellular network; configuring the radio bearer as the CWA bearer according to the first radio bearer configuration; enabling data handling for the CWA bearer at a CWA adaption protocol (CWAAP) entity in response to the first CWA configuration; communicating a first plurality of CWAAP protocol data units (PDUs) associated to the CWA bearer with a WLAN at the CWAAP entity, when enabling the data handling for the CWA bearer; receiving a handover command from the first cell or performing a radio resource control (RRC) connection reestablishment procedure, wherein the handover command configures the communication device to perform a handover to a second cell of the cellular network; and disabling the data handling for the CWA bearer at the CWAAP entity, and determining that the radio bearer is a cellular-only bearer, in response to the handover command or the RRC connection reestablishment procedure.

A communication device for handling a CWA comprises a storage device for storing instructions and a processing circuit coupled to the storage device. The processing circuit is configured to execute the instructions stored in the storage device. The instructions comprise receiving a first configuration message configuring a CWA for a radio bearer, from a first cell of a cellular network; enabling data handling for the radio bearer at a CWAAP entity according to the first configuration message; communicating a plurality of CWAAP PDUs associated to the radio bearer with a first WLAN at the CWAAP entity, when enabling the data handling for the radio bearer; receiving a handover command from the first cell of the cellular network, wherein the handover command configures the communication device to perform a handover to a second cell of the cellular network; disabling the data handling for the radio bearer at the CWAAP entity in response to the handover command; and enabling the data handling for the radio bearer at the CWAAP entity, when the handover command configures the CWA and the communication device completes the handover.

A communication device for handling a CWA comprises a storage device for storing instructions and a processing circuit coupled to the storage device. The processing circuit is configured to execute the instructions stored in the storage device. The instructions comprise receiving a first configuration message configuring a CWA for a radio bearer, from a first cell of a cellular network; enabling data handling for the radio bearer at a CWAAP entity according to the first configuration message; communicating a plurality of CWAAP PDUs associated to the radio bearer with a WLAN at the CWAAP entity, when enabling the data handling for the radio bearer; initiating a RRC connection reestablishment procedure to the first cell or a second cell of the cellular network; disabling the data handling for the radio bearer at the CWAAP entity in response to the RRC connection reestablishment procedure; and enabling the data handling for the radio bearer at the CWAAP entity, when receiving a second configuration message configuring the CWA from the first cell or the second cell, after the RRC connection reestablishment procedure.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
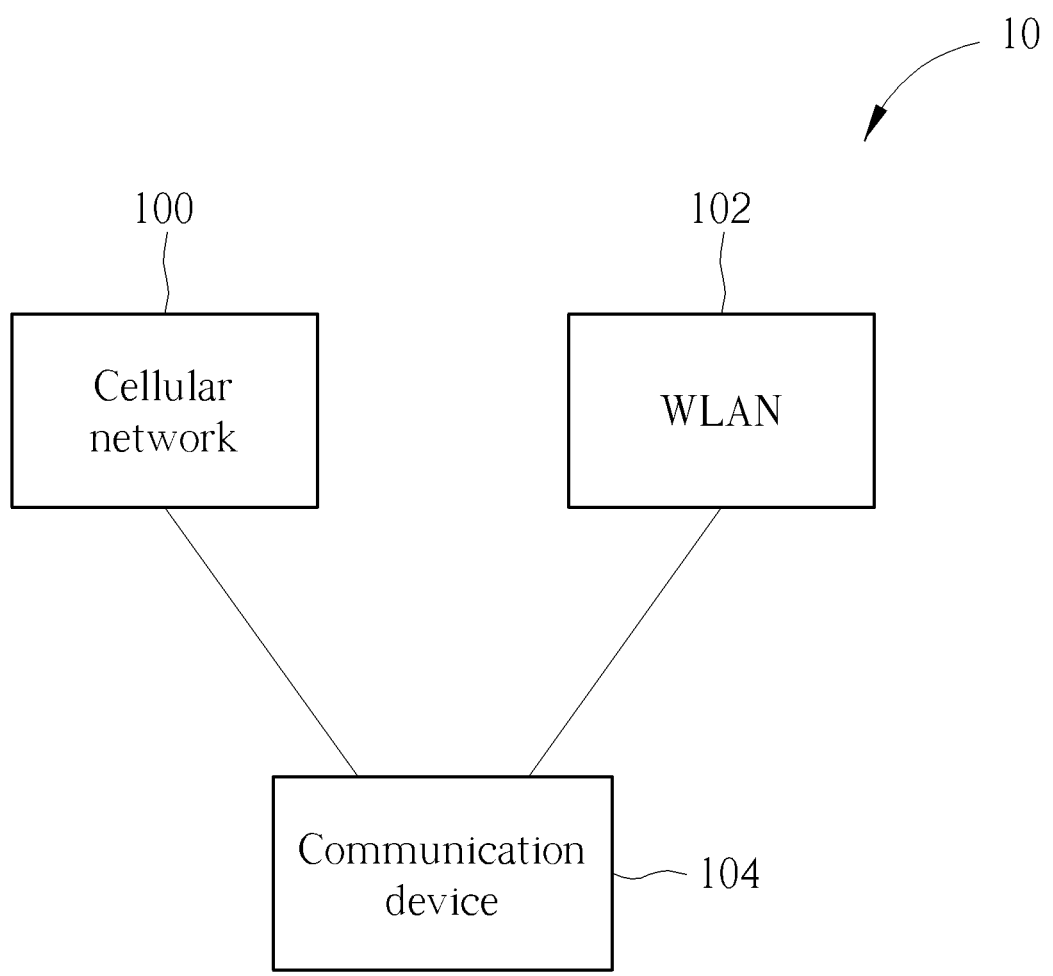
FIG. 1 is a schematic diagram of a wireless communication system according to an example of the present invention.

FIG. 1 is a schematic diagram of a wireless communication system 10 according to an example of the present invention. The wireless communication system 10 is briefly composed of a cellular network 100, a wireless local area network (WLAN) 102 and a communication device 104. The cellular network 100 may be an evolved Universal Terrestrial Radio Access Network (E-UTRAN) comprising at least one evolved Node-B (eNB) or a fifth generation (5G) network including at least one 5G base station (BS) which employs orthogonal frequency-division multiplexing (OFDM) and/or non-OFDM, and a transmission time interval (TTI) for communicating with the communication devices is smaller than 1 millisecond (ms). In general, a BS is used for referring any of the eNB and the 5G BS. In one example, a WLAN standard operated by the WLAN may include IEEE 802.11ax, 802.11ad, 802.11ac, 802.11n, 802.11g, 802.11b and 802.11a operated in 2.4 GHz or 5 GHz band.

The communication device 104 can be a user equipment (UE), a mobile phone, a laptop, a tablet computer, an electronic book, a portable computer system, a vehicle or aircraft. In addition, the cellular network 100 and the communication device 104 can be seen as a transmitter or a receiver according to direction (i.e., transmission direction). For example, for an uplink (UL), the communication device 104 is the transmitter and the cellular network 100 (or the WLAN 102) is the receiver, and for a downlink (DL), the cellular network 100 (or the WLAN 102) is the transmitter and the communication device 104 is the receiver.

Figure 2:
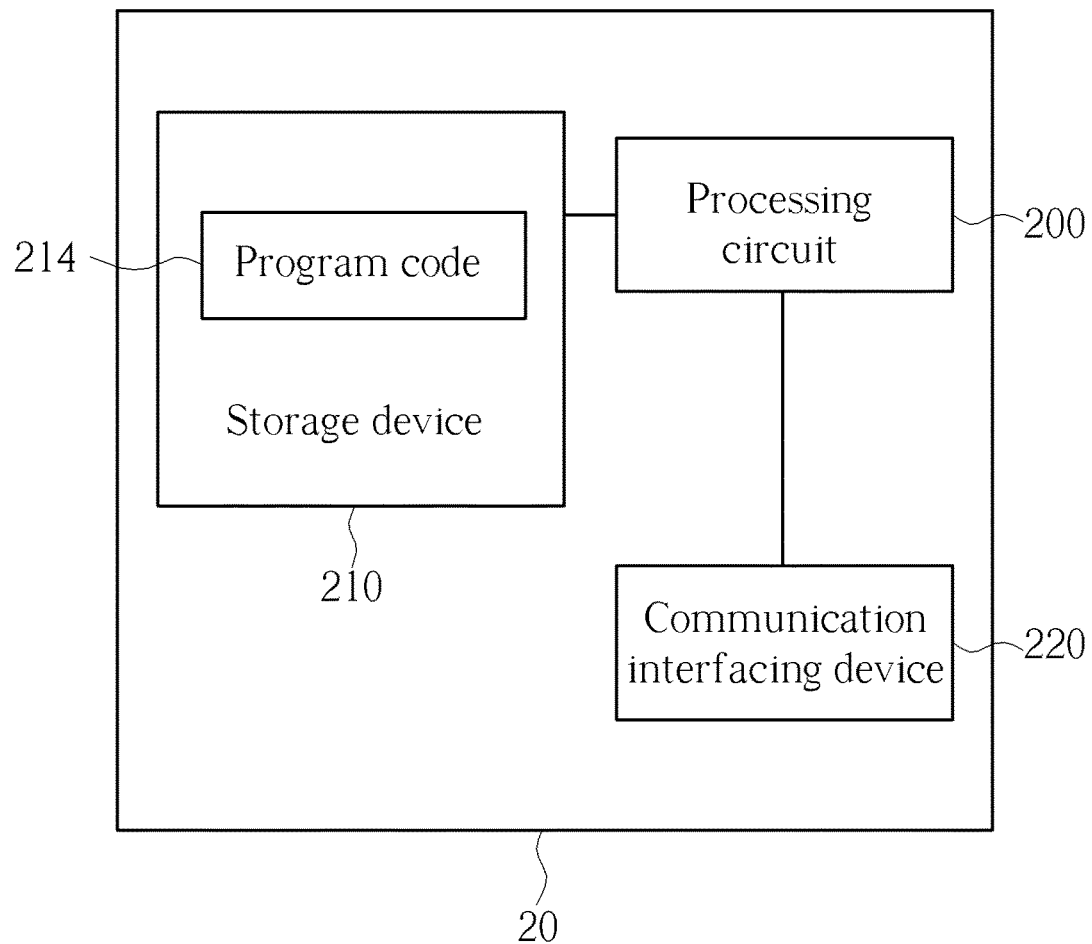
FIG. 2 is a schematic diagram of a communication device according to an example of the present invention.

FIG. 2 is a schematic diagram of a communication device 20 according to an example of the present invention. The communication device 20 may be the communication device 104, the cellular network 100 or the WLAN 102 shown in FIG. 1, but is not limited herein. The communication device 20 may include a processing circuit 200 such as a microprocessor or Application Specific Integrated Circuit (ASIC), a storage device 210 and a communication interfacing device 220. The storage device 210 may be any data storage device that may store a program code 214, accessed and executed by the processing circuit 200. Examples of the storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The communication interfacing device 220 includes at least one transceiver used to transmit and receive signals (e.g., data, messages and/or packets) according to processing results of the processing circuit 200.

In the following embodiments, a UE is used to represent the communication device 104 in FIG. 1, to simplify the illustration of the embodiments.

Figure 3:
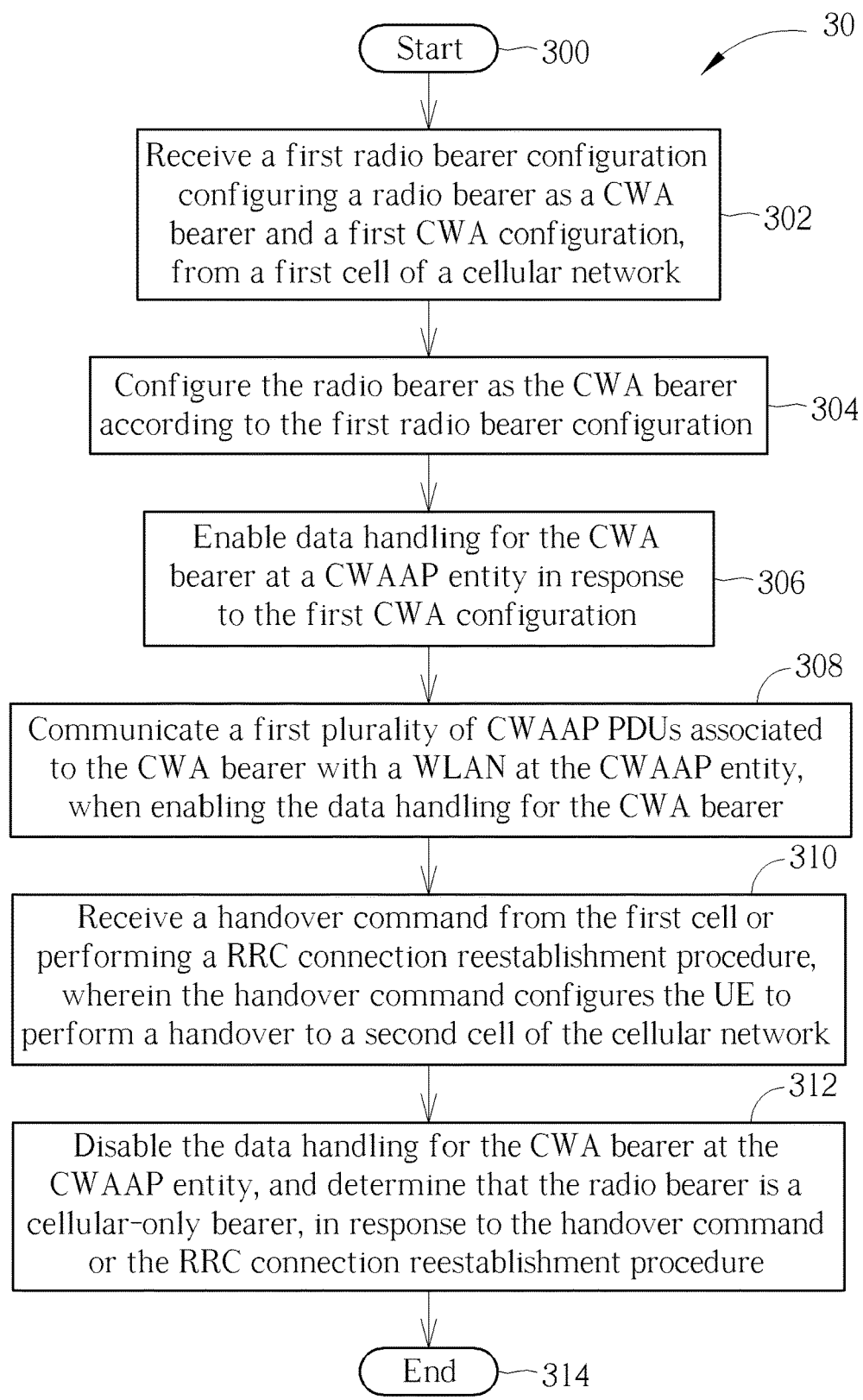
FIG. 3 is a flowchart of a process according to an example of the present invention.

FIG. 3 is a flowchart of a process 30 according to an example of the present invention. The process 30 can be utilized in a UE (e.g., the communication device 104), for handling a cellular-WLAN aggregation (CWA). The process 30 includes the following steps:

Step 300: Start.
Step 302: Receive a first radio bearer configuration configuring a radio bearer as a CWA bearer and a first CWA configuration, from a first cell of a cellular network.
Step 304: Configure the radio bearer as the CWA bearer according to the first radio bearer configuration.
Step 306: Enable data handling for the CWA bearer at a CWA adaption protocol (CWAAP) entity in response to the first CWA configuration.
Step 308: Communicate a first plurality of CWAAP protocol data units (PDUs) associated to the CWA bearer with a WLAN at the CWAAP entity, when enabling the data handling for the CWA bearer.
Step 310: Receive a handover command from the first cell or performing a radio resource control (RRC) connection reestablishment procedure, wherein the handover command configures the UE to perform a handover to a second cell of the cellular network.
Step 312: Disable the data handling for the CWA bearer at the CWAAP entity, and determine that the radio bearer is a cellular-only bearer, in response to the handover command or the RRC connection reestablishment procedure.
Step 314: End.

According to the process 30, the UE configures the radio bearer to be the cellular-only bearer in response to the handover command (e.g., a first RRCConnectionReconfiguration message) or the RRC connection reestablishment procedure. Then, the UE communicates cellular PDUs of the radio bearer only with the cellular network after handing over to the second cell or after the RRC connection reestablishment procedure, and before receiving a second radio bearer configuration configuring the radio bearer as the CWA bearer and receiving a second CWA configuration from the second cell. It should be noted that the handover command may not include any CWA configuration.

Figure 4:
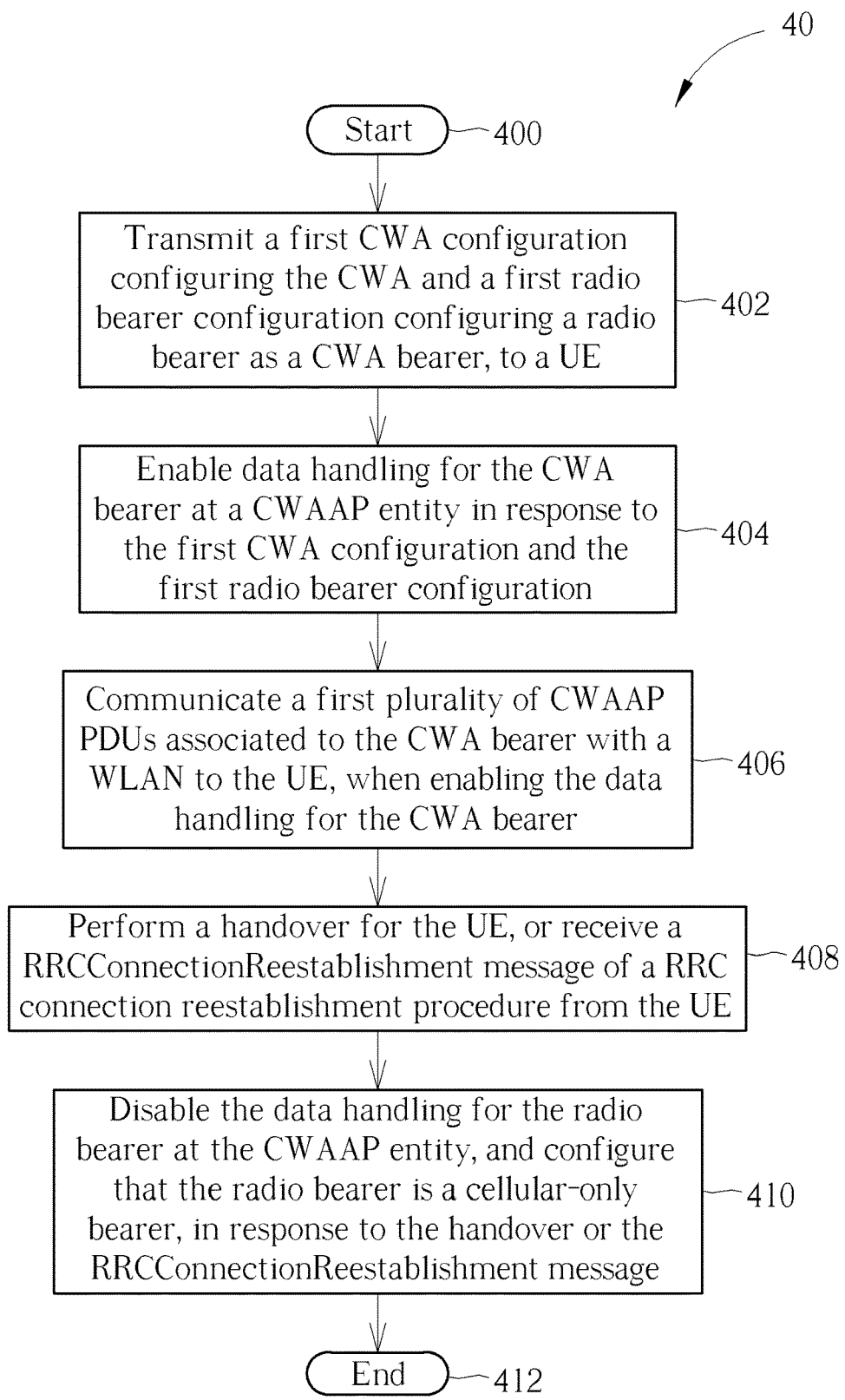
FIG. 4 is a flowchart of a process according to an example of the present invention.

FIG. 4 is a flowchart of a process 40 according to an example of the present invention. The process 40 can be utilized in a network (e.g., the cellular network 100), for handling a CWA. The process 40 includes the following steps:

Step 400: Start.
Step 402: Transmit a first CWA configuration configuring the CWA and a first radio bearer configuration configuring a radio bearer as a CWA bearer, to a UE.
Step 404: Enable data handling for the CWA bearer at a CWAAP entity in response to the first CWA configuration and the first radio bearer configuration.
Step 406: Communicate a first plurality of CWAAP PDUs associated to the CWA bearer with a WLAN to the UE, when enabling the data handling for the CWA bearer.
Step 408: Perform a handover for the UE, or receive a RRCConnectionReestablishment message of a RRC connection reestablishment procedure from the UE.
Step 410: Disable the data handling for the radio bearer at the CWAAP entity, and configure that the radio bearer is a cellular-only bearer, in response to the handover or the RRCConnectionReestablishment message.
Step 412: End.

Examples of the process 30 may be applied to the process 40. Realizations of the processes 30 and 40 are not limited to the above description. The following examples may be applied to the process 30 and 40.

In one example, a first BS of the network performs the handover procedure by performing a handover preparation procedure with a second BS of the network, or the first BS performs the handover procedure by transmitting a handover command to the UE.

In one example, the handover command configures the radio bearer to be the cellular-only radio bearer from the CWA bearer.

In one example, when the UE receives a second radio bearer configuration and a second CWA configuration in a second RRCConnectionReconfiguration from the cellular network (e.g., from the first BS or the second BS), the UE configures the radio bearer as the CWA bearer according to the second radio bearer configuration and enables the data handling for the CWA bearer at the CWAAP entity in response to the second CWA configuration and the second radio configuration. The UE may receive the second RRCConnectionReconfiguration after the handover or the RRC connection reestablishment procedure. Similarly, the network configures the radio bearer as the CWA bearer according to the second radio bearer configuration, and enables the data handling for the CWA bearer at the CWAAP entity in response to the second CWA configuration and the second radio configuration. Thus, the UE and the network communicates a second plurality of CWAAP PDUs associated to the CWA bearer via the WLAN at the CWAAP entity of the UE and the network, when enabling the data handling for the CWA bearer after the handover or the RRC connection reestablishment procedure.

In one example, the second BS receives the first radio bearer configuration comprising a bearer type of the radio bearer indicating that the radio bearer is the CWA bearer and a radio bearer identity for the radio bearer, from the first BS in a handover preparation procedure. In this case, the second BS determines that the radio bearer is a cellular-only bearer (e.g., the second BS ignores/discards the bearer type (e.g., drb-TypeLWA set to TRUE for the DRB by the first BS). In one example, the first BS does not include a bearer type of the radio bearer or includes the bearer type indicating that the radio bearer is not the CWA bearer (e.g., drb-TypeLWA set to FALSE) in the first radio bearer configuration. Accordingly, the second BS can determine that the radio bearer is a cellular-only radio bearer instead of the CWA bearer according to the first radio bearer configuration. Then, when the second BS intends to configure the CWA to the UE, the second BS transmits a second radio bearer configuration including the radio bearer identity and the bearer type indicating that the radio bearer is a CWA bearer and transmits a second CWA configuration to the UE. After that, the second BS enables data handling for the CWA bearer and communicates a second plurality of CWAAP PDUs associated to the CWA bearer with a WLAN to the UE when enabling the data handling for the CWA bearer.

Figure 5:
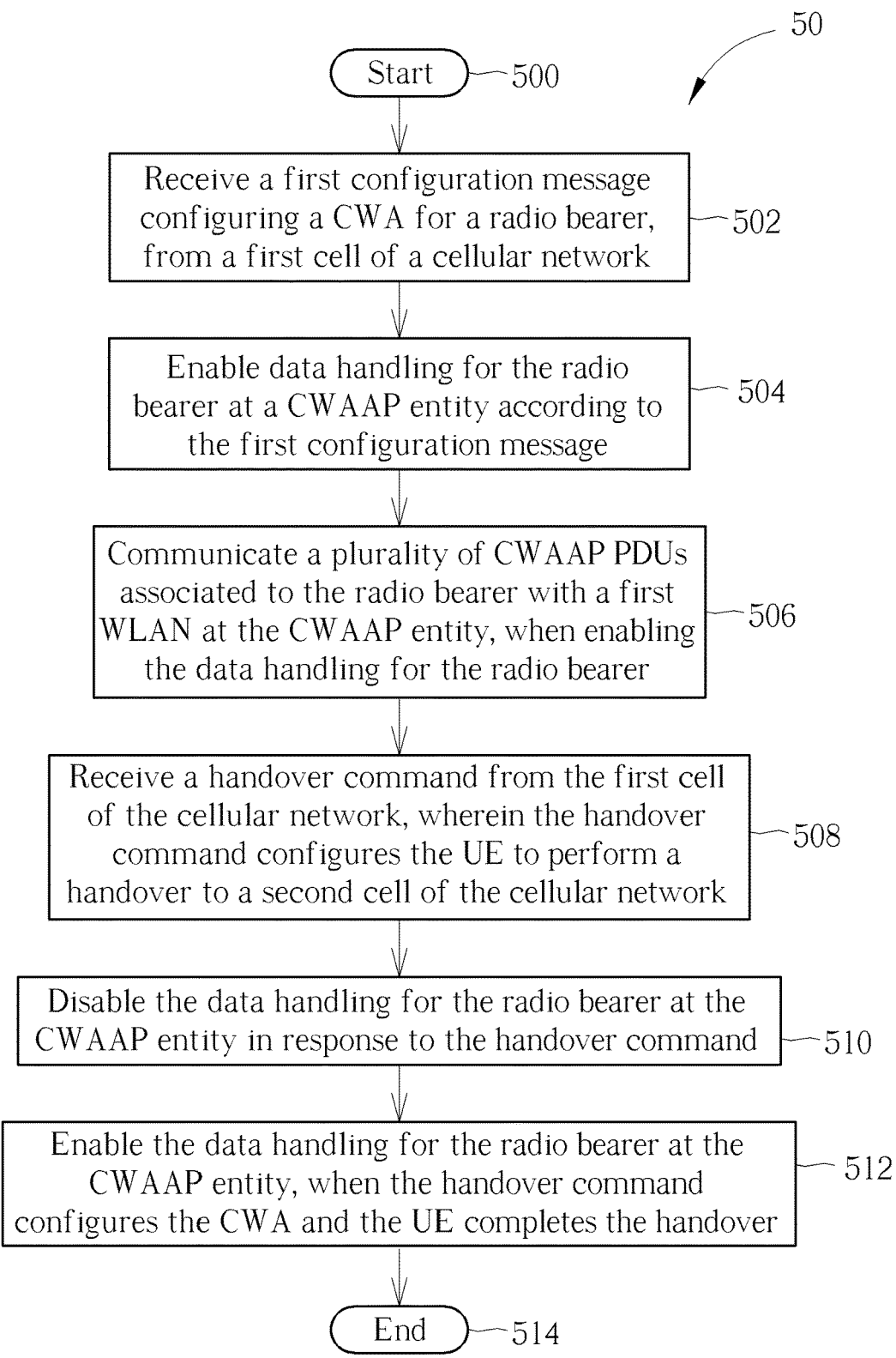
FIG. 5 is a flowchart of a process according to an example of the present invention.

FIG. 5 is a flowchart of a process 50 according to an example of the present invention. The process 50 can be utilized in a UE (e.g., the communication device 104), for handling a CWA. The process 50 includes the following steps:

Step 500: Start.
Step 502: Receive a first configuration message configuring a CWA for a radio bearer, from a first cell of a cellular network.
Step 504: Enable data handling for the radio bearer at a CWAAP entity according to the first configuration message.
Step 506: Communicate a plurality of CWAAP PDUs associated to the radio bearer with a first WLAN at the CWAAP entity, when enabling the data handling for the radio bearer.
Step 508: Receive a handover command from the first cell of the cellular network, wherein the handover command configures the UE to perform a handover to a second cell of the cellular network.
Step 510: Disable the data handling for the radio bearer at the CWAAP entity in response to the handover command.
Step 512: Enable the data handling for the radio bearer at the CWAAP entity, when the handover command configures the CWA and the UE completes the handover.
Step 514: End.

Realization of the process 50 is not limited to the above description. The following examples may be applied to the process 50.

In one example, the UE completes the handover, when successfully completing a random access procedure to the second BS or transmitting a handover complete to the second BS.

In one example, the first WLAN is configured by the first configuration message. If the handover command configures the CWA, the handover command may configure the first WLAN (i.e., the same WLAN configured by the first configuration message) or a WLAN different from the first WLAN.

In one example, the handover command may not configure the CWA. In this case, the UE disables the data handling for the radio bearer at the CWAAP entity in response to the handover command. The UE transmits a handover complete to the second cell. The UE enables the data handling for the radio bearer at the CWAAP entity, when receiving a second configuration message configuring the CWA from the second cell after performing the handover. The second configuration message configures the first WLAN (i.e., the same WLAN configured by the first configuration message) or a second WLAN.

Figure 6:
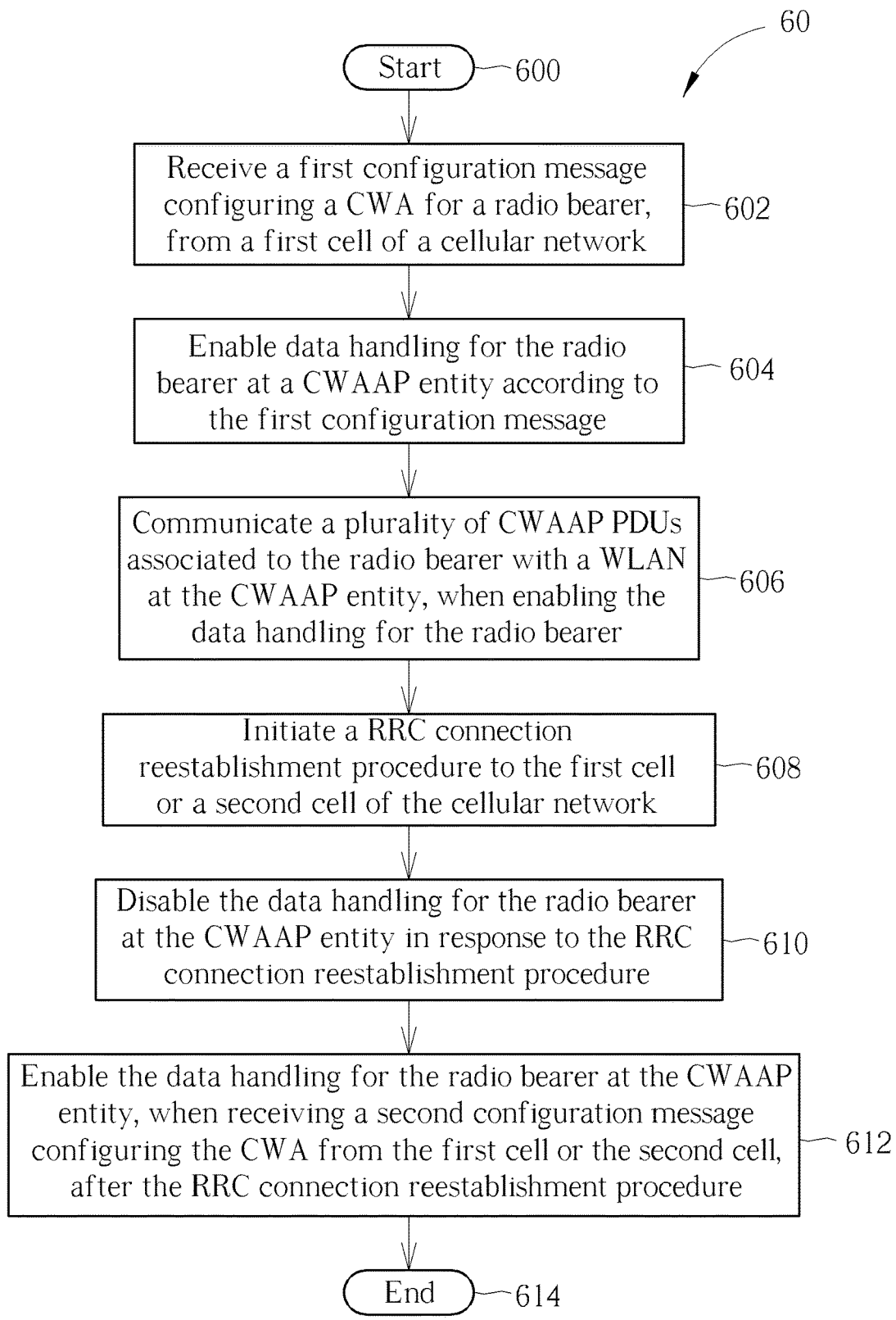
FIG. 6 is a flowchart of a process according to an example of the present invention.

FIG. 6 is a flowchart of a process 60 according to an example of the present invention. The process 60 can be utilized in a UE (e.g., the communication device 104), for handling a CWA. The process 60 includes the following steps:

Step 600: Start.
Step 602: Receive a first configuration message configuring a CWA for a radio bearer, from a first cell of a cellular network.
Step 604: Enable data handling for the radio bearer at a CWAAP entity according to the first configuration message.
Step 606: Communicate a plurality of CWAAP PDUs associated to the radio bearer with a WLAN at the CWAAP entity, when enabling the data handling for the radio bearer.
Step 608: Initiate a RRC connection reestablishment procedure to the first cell or a second cell of the cellular network.
Step 610: Disable the data handling for the radio bearer at the CWAAP entity in response to the RRC connection reestablishment procedure.
Step 612: Enable the data handling for the radio bearer at the CWAAP entity, when receiving a second configuration message configuring the CWA from the first cell or the second cell, after the RRC connection reestablishment procedure.
Step 614: End.

Figure 7:
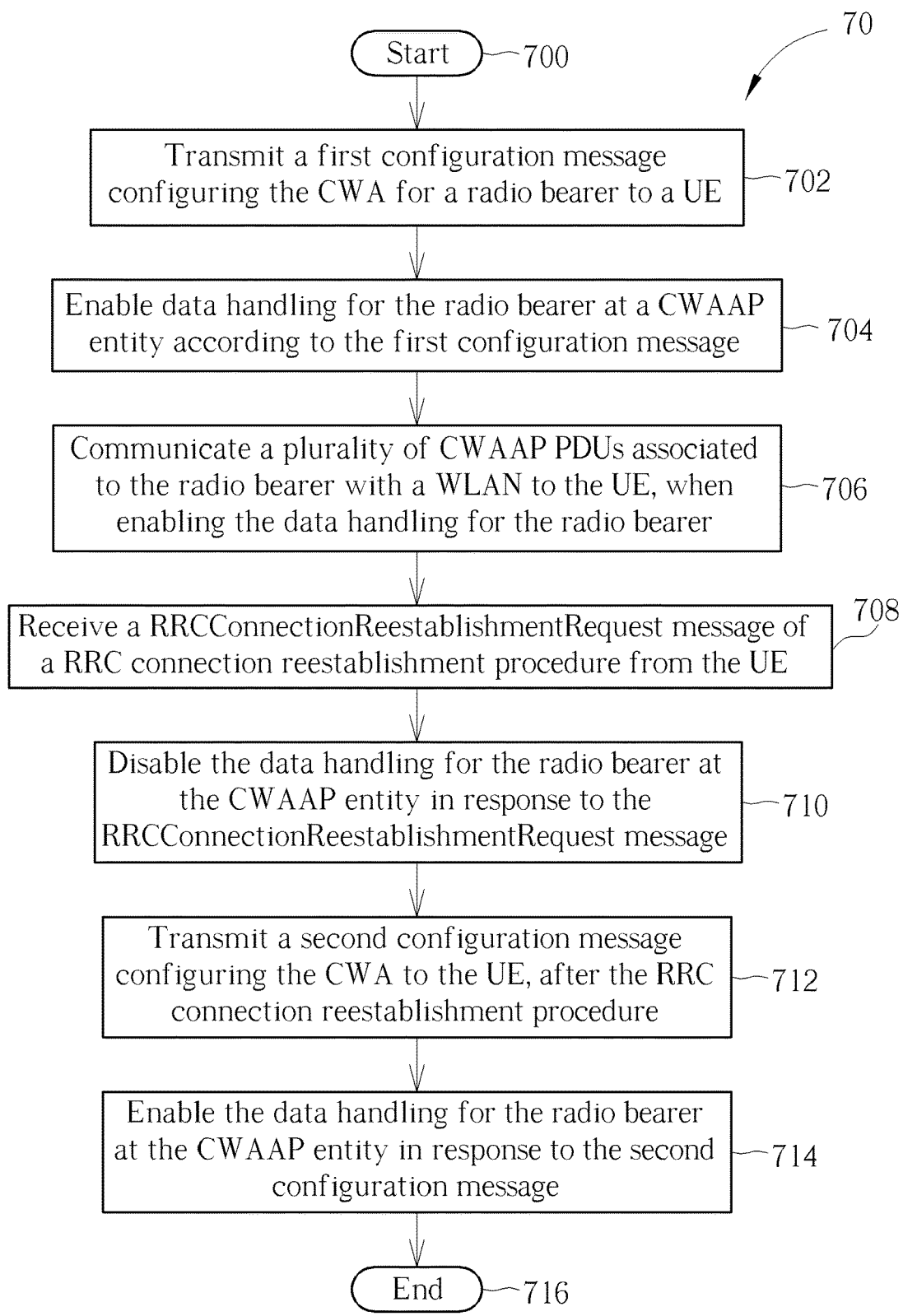
FIG. 7 is a flowchart of a process according to an example of the present invention.

FIG. 7 is a flowchart of a process 70 according to an example of the present invention. The process 70 can be utilized in a network (e.g., the cellular network 100), for handling a CWA. The process 70 includes the following steps:

Step 700: Start.
Step 702: Transmit a first configuration message configuring the CWA for a radio bearer to a UE.
Step 704: Enable data handling for the radio bearer at a CWAAP entity according to the first configuration message.
Step 706: Communicate a plurality of CWAAP PDUs associated to the radio bearer with a WLAN to the UE, when enabling the data handling for the radio bearer.
Step 708: Receive a RRCConnectionReestablishmentRequest message of a RRC connection reestablishment procedure from the UE.
Step 710: Disable the data handling for the radio bearer at the CWAAP entity in response to the RRCConnectionReestablishmentRequest message.
Step 712: Transmit a second configuration message configuring the CWA to the UE, after the RRC connection reestablishment procedure.

Step 714: Enable the data handling for the radio bearer at the CWAAP entity in response to the second configuration message.

Step 716: End.

Realizations of the processes 50, 60 and 70 are not limited to the above description. The following examples may be applied to the processes 50, 60 and 70.

In one example, the first configuration message includes a first CWA Configuration configuring a CWA. The handover command includes or does not include a second CWA Configuration configuring the CWA. The second configuration message includes the second CWA Configuration configuring the CWA. The first CWA Configuration and the second CWA Configuration have the same content or different content. In one example, the first configuration message includes a drb-ToAddModList configuring the radio bearer, and indicates the radio bearer as a CWA DRB (e.g., LWA DRB or 5G-WLAN aggregation (5GWA) DRB), i.e., adding the radio bearer as a CWA DRB to the UE or reconfiguring the radio bearer from a cellular-only DRB to a CWA DRB. In one example, the cellular network transmits a third configuration message including the drb-ToAddModList to the UE. In one example, the second configuration message and the handover command include or do not include the drb-ToAddModList.

In one example, the UE disables the data handling at the CWAAP entity for the CWA radio bearer by stopping processing a first received CWAAP PDU associated to a CWA radio bearer. That is, the UE discards the received CWAAP PDU when the UE disables the data handling. Alternatively, the UE processes the received CWAAP but the UE discards a packet data convergence protocol (PDCP) PDU in the received CWAAP PDU. Thus, erroneous decryption of the PDCP PDU can be avoided in the UE. In addition, the UE disables the data handling at the CWAAP entity for the CWA radio bearer by stopping transmitting a first plurality of PDCP PDUs associated to the CWA radio bearer at the CWAAP entity, if a first uplink (UL) transmission to the WLAN is configured by the cellular network for the CWA. That is, the UE does not transmit a CWAAP PDU including a PDCP PDU to the WLAN when the UE disables the data handling at the CWAAP entity.

In one example, the UE enables the data handling at the CWAAP entity for the CWA radio bearer by starting processing a second received CWAAP PDU associated to a CWA radio bearer. That is, the UE starts processing the received CWAAP PDU when the UE enables the data handling. In other words, the UE forwards a PDCP PDU in the received CWAAP PDU to its PDCP entity associated to the CWA radio bearer. In addition, the UE enables the data handling at the CWAAP entity for the CWA radio bearer by starting transmitting a second plurality of PDCP PDUs associated to the CWA radio bearer at the CWAAP entity, if a second UL transmission to the WLAN is configured by the cellular network for the CWA. That is, the UE starts transmitting a CWAAP PDU including a PDCP PDU to the WLAN when the UE enables the data handling at the CWAAP entity.

In one example, the first configuration message is a first RRCConnectionReconfiguration message which may or may not include mobilityControlInfo. The second configuration message may be a second RRCConnectionReconfiguration message which may or may not include mobilityControlInfo. The third configuration message may be a third RRCConnectionReconfiguration message.

In one example, the network receives the RRCConnectionReestablishmentRequest message of the RRC connection reestablishment procedure performed by the UE via the first cell or a second cell of the network. In response to the RRCConnectionReestablishmentRequest message, the network may transmit a RRCConnectionReestablishment message to the UE. The UE may transmit a RRCConnectionReestablishmentComplete message to the network in response to the RRCConnectionReestablishment message.

The following examples may be applied to the above processes.

In one example, the radio bearer configuration is a DRB-ToAddMod. The "CWA" may be "LWA" or 5GWA. The radio bearer may be a LWA DRB or 5GWA DRB. Each of the CWAAP PDUs may include a cellular PDU. The cellular PDU may be a PDCP PDU. "Communicate" may mean "transmit and/or receive". Any two of the cells described above may belong to a same BS or different BSs. In one example, the first cell and the second cell are a same cell or different cells.

The abovementioned description, steps and/or processes including suggested steps can be realized by means that could be hardware, software, firmware, an electronic system, or combination thereof. An example of the means may be the communication device 20. Any of the above processes and examples above may be compiled into the program code 214.

To sum up, the present invention solves a problem that after performing the handover or RRC connection reestablishment, the UE does not transmit any cellular PDU over a WLAN configured for the LWA nor processes any PDU received from the WLAN.

Those skilled in the art will readily observe that numerous modifications and alterations on the abovementioned description and examples may be made while retaining the teachings of the invention. Accordingly, the above disclosure should be construed as limited only by the metes and bounds of the appended claims.

What is claimed is:

1. A communication device for handling a cellular-wireless local area network (WEAN) aggregation (CWA), comprising:
   a storage device, for storing instructions of:
      receiving a first radio bearer configuration configuring a radio bearer as a CWA bearer and a first CWA configuration, from a first cell of a cellular network;
      configuring the radio bearer as the CWA bearer according to the first radio bearer configuration;
      enabling data handling for the CWA bearer at a CWA adaption protocol (CWAAP) entity in response to the first CWA configuration;
      communicating a first plurality of CWAAP protocol data units (PDUs) associated to the CWA bearer with a WEAN at the CWAAP entity, when enabling the data handling for the CWA bearer;
      receiving a handover command from the first cell or performing a radio resource control (RRC) connection reestablishment procedure, wherein the handover command configures the communication device to perform a handover to a second cell of the cellular network; and
      disabling the data handling for the CWA bearer at the CWAAP entity, and determining that the radio bearer is a cellular-only bearer, in response to the handover command or the RRC connection reestablishment procedure; and
   a processing circuit, coupled to the storage device, configured to execute the instructions stored in the storage device.

2. The communication device of claim 1, wherein the storage device further stores the instructions of:
  receiving a second radio bearer configuration and a second CWA configuration, from the second cell or a third cell of the cellular network;
  configuring the radio bearer as the CWA bearer according to the second radio bearer configuration;
  enabling the data handling for the CWA bearer at the CWAAP entity in response to the second CWA configuration; and
  communicating a second plurality of CWAAP PDUs associated to the CWA bearer with the WLAN at the CWAAP entity, when enabling the data handling for the CWA bearer.

3. The communication device of claim 1, wherein the first radio bearer configuration does not comprise a bearer type of the radio bearer, or comprises the bearer type indicating that the radio bearer is not the CWA bearer.

4. A communication device for handling a cellular-wireless local area network (WLAN) aggregation (CWA), comprising:
  a storage device, for storing instructions of:
  receiving a first configuration message configuring a CWA for a radio bearer, from a first cell of a cellular network;
  enabling data handling for the radio bearer at a CWA adaption protocol (CWAAP) entity according to the first configuration message;
  communicating a plurality of CWAAP protocol data units (PDUs) associated to the radio bearer with a first WLAN at the CWAAP entity, when enabling the data handling for the radio bearer;
  receiving a handover command from the first cell of the cellular network, wherein the handover command configures the communication device to perform a handover to a second cell of the cellular network;
  disabling the data handling for the radio bearer at the CWAAP entity in response to the handover command; and
  enabling the data handling for the radio bearer at the CWAAP entity, when the handover command configures the CWA and the communication device completes the handover; and
  a processing circuit, coupled to the storage device, configured to execute the instructions stored in the storage device.

5. The communication device of claim 4, wherein the communication device completes the handover, when successfully completing a random access procedure to the second cell or transmitting a handover complete to the second cell.

6. The communication device of claim 4, wherein the handover command does not configure the CWA.

7. The communication device of claim 4, wherein the storage device further stores the instructions of:
  transmitting a handover complete to the second cell; and
  enabling the data handling for the radio bearer at the CWAAP entity, when receiving a second configuration message configuring the CWA from the second cell after performing the handover.

8. The communication device of claim 7, wherein the second configuration message configures the first WLAN or a second WLAN.

9. A communication device for handling a cellular-wireless local area network (WLAN) aggregation (CWA), comprising:
  a storage device, for storing instructions of:
  receiving a first configuration message configuring a CWA for a radio bearer, from a first cell of a cellular network;
  enabling data handling for the radio bearer at a CWA adaption protocol (CWAAP) entity according to the first configuration message;
  communicating a plurality of CWAAP protocol data units (PDUs) associated to the radio bearer with a WLAN at the CWAAP entity, when enabling the data handling for the radio bearer;
  initiating a radio resource control (RRC) connection reestablishment procedure to the first cell or a second cell of the cellular network;
  disabling the data handling for the radio bearer at the CWAAP entity in response to the RRC connection reestablishment procedure; and
  enabling the data handling for the radio bearer at the CWAAP entity, when receiving a second configuration message configuring the CWA from the first cell or the second cell, after the RRC connection reestablishment procedure; and
  a processing circuit, coupled to the storage device, configured to execute the instructions stored in the storage device.

10. The communication device of claim 9, wherein the first configuration message comprises a first CWA Configuration configuring the CWA, and the second configuration message comprises a second CWA Configuration configuring the CWA.

11. The communication device of claim 9, wherein the first configuration message comprises a drb-ToAddModList configuring the radio bearer, and indicates the radio bearer as a CWA data radio bearer (DRB).

12. The communication device of claim 9, wherein the communication device receives the first configuration message, the handover command and the second configuration message and transmits a handover complete on a RRC connection established between the communication device and the cellular network.

13. The communication device of claim 9, wherein each of the plurality of CWAAP PDUs comprises a Packet Data Convergence Protocol (PDCP) PDU.

14. The communication device of claim 9, wherein the instruction of disabling the data handling for the radio bearer at the CWAAP entity comprises:
  stopping processing a first received CWAAP PDU associated to a CWA radio bearer; and
  stopping transmitting a first plurality of PDCP PDUs associated to the CWA radio bearer at the CWAAP entity, if a first uplink (UL) transmission to the WLAN is configured by the cellular network for the CWA.

15. The communication device of claim 9, wherein the instruction of enabling the data handling for the radio bearer at the CWAAP entity comprises:
  starting processing a second received CWAAP PDU associated to a CWA radio bearer; and
  starting transmitting a second plurality of PDCP PDUs associated to the CWA radio bearer at the CWAAP entity, if a second UL transmission to the WLAN is configured by the cellular network for the CWA.

* * * * *

UNITED STATES PATENT AND TRADEMARK OFFICE
CERTIFICATE OF CORRECTION

PATENT NO. : 10,206,151 B2
APPLICATION NO. : 15/657220
DATED : February 12, 2019
INVENTOR(S) : Chih-Hsiang Wu Page 1 of 1

It is certified that error appears in the above-identified patent and that said Letters Patent is hereby corrected as shown below:

In the Claims

Please correct at Column 8, Claim number 1, Line number 40 and Line number 53;
"WEAN" should be
--WLAN--.

Signed and Sealed this
Eighth Day of April, 2025

Coke Morgan Stewart
*Acting Director of the United States Patent and Trademark Office*